US009286475B2

(12) United States Patent
Li et al.

(10) Patent No.: US 9,286,475 B2
(45) Date of Patent: Mar. 15, 2016

(54) SYSTEMS AND METHODS FOR ENFORCEMENT OF SECURITY PROFILES IN MULTI-TENANT DATABASE

(75) Inventors: Yue Li, Webster, NY (US); Chloe Pajerek, Rochester, NY (US); Manish Dixit, Rochester, NY (US); Jeremy L. Reitz, Marion, NY (US)

(73) Assignee: XEROX CORPORATION, Norwalk, CT (US)

( * ) Notice: Subject to any disclaimer, the term of this patent is extended or adjusted under 35 U.S.C. 154(b) by 138 days.

(21) Appl. No.: 13/401,319

(22) Filed: Feb. 21, 2012

(65) Prior Publication Data

US 2013/0218911 A1   Aug. 22, 2013

(51) Int. Cl.
G06F 17/30   (2006.01)
G06F 21/60   (2013.01)

(52) U.S. Cl.
CPC ........ *G06F 21/604* (2013.01); *G06F 17/30289* (2013.01)

(58) Field of Classification Search
CPC ............ G06F 17/30471; G06F 21/604; G06F 17/30289
USPC .......................................................... 707/754
See application file for complete search history.

(56) References Cited

U.S. PATENT DOCUMENTS 7,752,215 B2 *   7/2010   Dettinger et al. ............. 707/757
8,086,615 B2 *   12/2011  Patrick et al. ................. 707/754
2005/0283478 A1 *  12/2005  Choi et al. ......................... 707/9
2007/0083514 A1 *  4/2007   Dettinger et al. ................. 707/7
2012/0233321 A1 *  9/2012   Dreke et al. ................... 709/224

OTHER PUBLICATIONS

Joseph Sack, SQL Server 2008 Transact-SQL Recipes, 2008, Apress, pp. 343-372.*
Bob Lambert et al., Pretty Good Row Level Security, 2008, CapTech Ventures, Inc., pp. 1-22.*

* cited by examiner

*Primary Examiner* — Apu Mofiz
*Assistant Examiner* — Dara J Glasser
(74) *Attorney, Agent, or Firm* — MH2 Technology Law Group LLP (57) ABSTRACT

Embodiments relate to systems and methods for the enforcement of security profiles in a multi-tenant database. A multi-tenant database can be populated with data from different users or other entities. Different users may enjoy different sets of permissions to access, modify, store, and/or otherwise manipulate sets of data within the database. After authentication, a user's associated set of permissions are retrieved. When data is requested, matching tables or other objects located in the database are identified based on the user's query. Rather than retrieving matching tables or other objects directly, a meta data security engine can check the requesting user's permissions, and apply any filters or restrictions required by those permissions to the data present in the table(s). A substitution can be made of a table-valued function, including any filtered data entries, for the table itself. Flexible and granular data security rules can thereby be applied, transparently to the user.

20 Claims, 5 Drawing Sheets

SYSTEMS AND METHODS FOR ENFORCEMENT OF SECURITY PROFILES IN MULTI-TENANT DATABASE

FIELD

The present teachings relate to systems and methods for the enforcement of security profiles in a multi-tenant database, and more particularly, to platforms and techniques for exposing the internal data model of a multi-tenant database to users on public or private networks, while applying desired security protocols to the accessing of selected data by individual users and others.

BACKGROUND

In the field of network database management, the use of multi-tenant databases which host data for two or more distinct users or entities is known. The data hosted within the overall database can include various types, levels, and configurations of data, for access and consumption by a potentially diverse set of applications. Within the field of applications such as centralized asset, supplies, and incident management applications, it is not uncommon for client applications to request data from a central database that applies or imposes different implementation techniques, to ensure that users of a given client application only see data that they are entitled to. A common implementation technique involves the client applications creating and managing a duplicate set of access control rules that reproduce the ones that exist in the central application database. While this approach has potential benefits, such as flexibility, it incurs a high cost of maintenance, and is not scalable to multiple client applications.

Another approach in known database technology is for client applications to access and consume a set of application programming interfaces (APIs) that control and manage the data security for the client applications. This minimizes the duplication of effort, but reduces the flexibility available from the model, placing the burden of change on the central application database since that database must adapt the suite of APIs to new application needs.

It may be desirable to provide methods and systems for the enforcement of security profiles in multi-tenant database, in which security policies for a diverse range of applications can be installed and managed via a central multi-tenant database, while making the specification and application of the security policies transparent to applications and users while remaining scalable and relatively flexible or configurable.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for the enforcement of security profiles in a multi-tenant database. More particularly, embodiments relate to platforms and techniques for configuring, maintain, and enforcing a set of security-related permissions in a multi-tenant database, and/or other data store. In aspects, multiple users and/or other entities can maintain data sets in a single database hosting multiple users or tenants. Different users may have different access rights and/or other permissions to different portions of the data stored in the multi-tenant database. In embodiments, the multi-tenant database can store the resident data in a table-based format, and can for instance be structured as a SQL database, although other types of data stores can be used. After authentication, a meta data security engine can retrieve a user's assigned set of permissions, and access or apply those permissions to via table-valued function. The table-valued function can provide a view on the data which the user has requested while suppressing or filtering those data components which the user does not have the required permission to read or access. The table-valued function can thereby serve to filter or condition the retrieval of data by individual users, in a transparent manner that does not require any manual configuration by the user making the data query. Greater flexibility and granularity in the management of access rights can therefore be maintained.

Reference will now be made in detail to exemplary embodiments of the present teachings, which are illustrated in the accompanying drawings. Where possible the same reference numbers will be used throughout the drawings to refer to the same or like parts.

Figure 1:
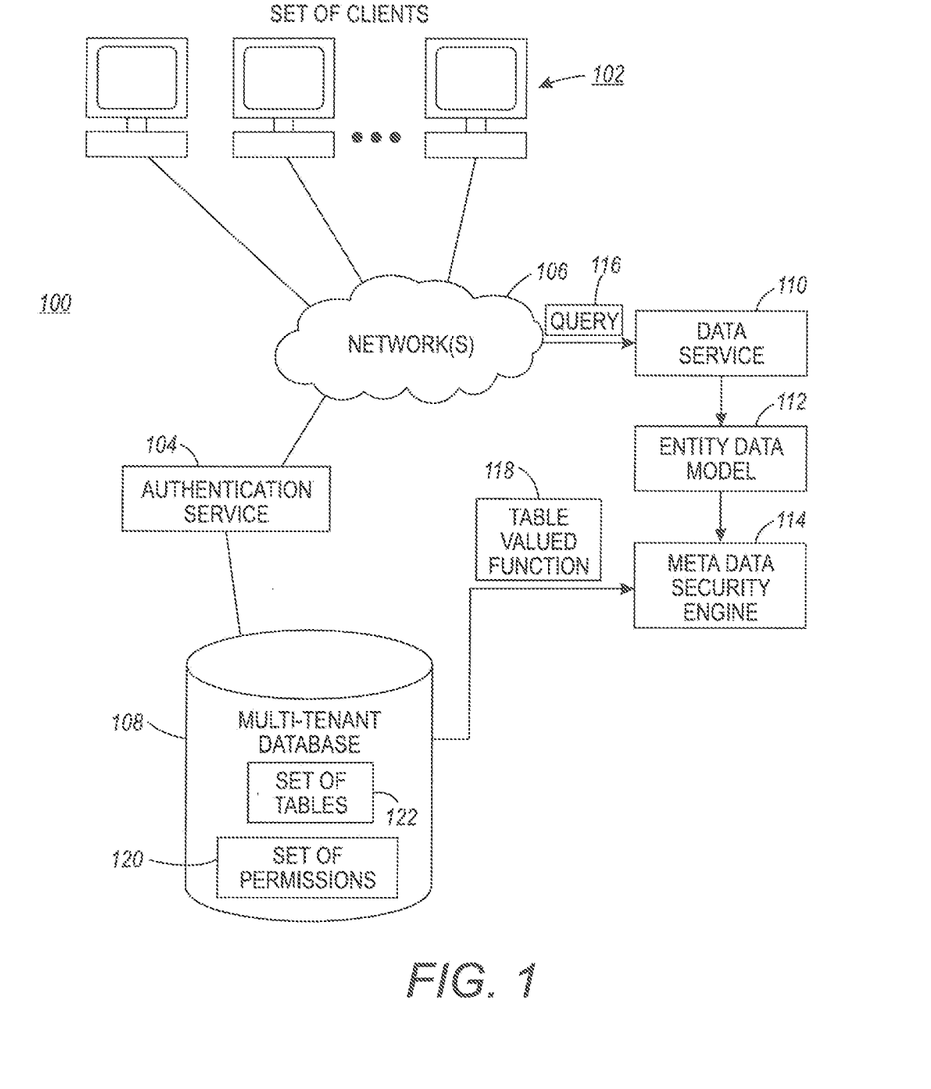
FIG. 1 illustrates an overall network which can be used in systems and methods for the enforcement of security profiles in multi-tenant database, according to various embodiments.

FIG. 1 illustrates an overall network 100 in which systems and methods for the enforcement of security profiles in a multi-tenant database can operate, according to aspects. In aspects as shown, a set of clients 102 can communicate with a multi-tenant database 110 via one or more networks 106. In aspects, the set of clients 102 can include any of a variety of desktop computers, laptop computers, network-enabled cellular phones, and/or other devices, applications, and/or services. In aspects, the data service 110 can be or include a SQL (structured query language) and/or other network-enabled, relational, hierarchical, and/or other database, data store, and/or data hosting facility or service. The one or more networks 106 through which one or more of the set of clients 102 can connect with the data service 110 can be or include the Internet, and/or other public or private networks, connections, and/or channels.

In aspects as also shown, one or more client in the set of clients 102 and/or other devices, platforms, services, and/or user portals can access the data service 110 via, and/or in association with, a number of intermediate services, applications, and/or engines designed to deliver authentication, data, security, and/or other services while processing data queries from the user. More particularly, in aspects as shown, the set of clients 102 and/or other devices, platforms, services, and/or or user portals which is initiating access to the data service 110 can first interact with an authentication service 108. The multi-tenant database 108 can be or include, for example, the Windows™ Communication Foundation (WCF) service, and/or other proprietary and/or public domain authentication applications and/or services. At time of login, the user of the subject set of clients 102 and/or other devices, platforms, services, and/or user portals can proceed through a login process including the receipt of a user name, password, and/or other credentials from the user. After receiving positive authentication results from the multi-tenant database 108, the user of the set of clients 102 and/or other devices, platforms, services, and/or user portals can be connected to, and/or permitted to access, the data service 110 for purposes of data access, retrieval, updating, and/or other data manipulation or activities.

In aspects, the user can transmit a query 116 to the data service 110, for purposes of interrogating the a set of tables 122 and/or other information hosted in the multi-tenant database 108, and receiving back from that database various data, outputs, reports, and/or other results. In aspects, the data service 110 can communicate with an entity data model 112, which can present or expose the data structure, schema, and/or model to the user and/or others to permit query and database activities. The entity data model 112 can, for instance, expose the tables, columns, rows, hierarchies, and/or other logical arrangements of the data hosted in the multi-tenant database 108. In aspects, the data entity model 112 and/or other published or exposed model, schema, and/or configuration can in turn communicate with a meta data security engine 114 which mediates the delivery of results to the query 116 via a set of permissions 120 accessed or maintained by the meta-data security engine 114 and/or other security application, platform, and/or service. In aspects, the meta-data security engine 114 can be or include one or more platforms, applications, services, and/or logic used to map portions or all of the data hosted in the multi-tenant database 108 to those users or other entities entitled to view and/or manipulate that data, for instance by building a set of tables which record information including tables or other entities exposed to applications or users of the multi-tenant database, along with necessary permissions needed by users or groups to access that data, and/or other information. Different levels of access control can be enforced via meta-data security engine 114, including user-level controls, group-level controls, column-level controls, row-level controls, and/or others. In implementations, the set of entities, users, groups, permissions, and/or other control features can be stored or encoded in formats other than table formats, if desired or called for by implementation.

In aspects, the set of permissions 120 can include access control lists, filters, privilege requirements, user-specific access rights, and/or other security information determining the data reading, writing, updating, and/or other activities permitted by one or more users. In embodiments as shown, the set of permissions 120 and/or other security or access rules, filters, criteria, privileges, user profiles and/or profiles for other entities, and/or functions can be stored or hosted in the multi-tenant database 108, itself. In further embodiments, the set of permissions can be stored in one or more other data stores associated with the meta-data security engine 114 and/or other security applications, platforms, sites, locations, and/or services.

In embodiments, the data service 110 can receive the query 116 and generate a query, such as a SQL query, that is compatible with the data model or schema presented in the data entity model 112 and/or other published or exposed model, schema, and/or configuration, and transmit that translated request, command, and/or instructions to the data entity model 112 and/or other published or exposed model, schema, and/or configuration. The data entity model 112 and/or other published or exposed model, schema, and/or configuration can receive the SQL and/or other request, command, and/or instructions to the meta-data security engine 114 and/or other security application, platform, and/or service. In aspects, the meta-data security engine 114 and/or other security application, platform, and/or service can receive the SQL and/or other request, command, and/or instructions and analyze that request or query in light of the set of permissions 120 that apply to the user who supplied query 116. In aspects, this can include examining the overall level of permission and/or access rights that are afforded to the user, the specific tables, fields, variables, and/or other information that the query 116 calls for, and/or other information to filter or condition the results to be generated for the user's query 116. Merely in terms of an example, a query 116 received from Company A can request data related laboratory results for a particular pharmaceutical trial, in cases where the multi-tenant database 108 includes medically-related information. The meta-data security engine 114 and/or other security application, platform, and/or service can receive the corresponding SQL and/or other request, command, and/or instructions for that data, and consult the set of permissions 120 to ensure that the user is associated with Company A, and that user and/or Company A as a whole has access permission to view those results. In aspects, the set of permissions 120 may indicate that a second Company B has rights to view its own data but no access rights to view the clinical data of Company A, while Company C, which could for instance be in a joint development effort with Company A, is entitled to also view the results of Company A, without restriction. In cases, different users of a given company and/or other organization may have rights to view different parts of the data associated with their company. In general, the set of permissions 120 can establish data rights to all of the set of tables 122 contained in the multi-tenant database 108, and/or to any subset or subsets of the set of tables 122, including, for instance, selected fields, columns, tables, variables, and/or other data components of the set of tables 122 and/or other information content of the multi-tenant database 108. In aspects, the set of permissions 120 and/or other security or access rules, filters, criteria, profiles, privileges, and/or functions can be selected to establish data control at any level of granularity specified by a user and/or organization, administrator of the multi-tenant database 108, and/or other person or entity. In further aspects, the set of permissions 120 and/or other security or access rules, filters, criteria, profiles, privileges, and/or functions can be applied to the content of query 116 in a transparent manner, so that the user is not aware of the additional data to which the user does not enjoy rights. Similarly, the set of permissions 120 and/or other security or access rules, filters, criteria, profiles, privileges, and/or functions can be set up and configured by the user, organization, administrator of the multi-tenant database 108, and/or other person or entity at any time and/or can be imported or generated automatically.

After processing of the content of query 116 and applying the set of permissions 120, the meta-data security engine 114 and/or other security application, platform, and/or service can intercept, adapt, filter, and/or otherwise modify or process the data contained in the set of tables 122 to generate results in the form of a table valued function 118, rather than directly outputting matching data from the set of tables 122. In aspects, the table valued function 118 can replace or be substituted for the raw data contained in the set of tables 118, yet operate to provide a view of all the constituent data of the set of tables 122 to which the user is entitled through the set of permissions 120. The view to accessible data delivered by the table valued function 118 can in aspects be fully compatible with the SQL or other format of the query 116, so that again the results contained in the table valued function 118 are transparent to the user, without adaptation or additional processing, while still ensuring necessary security and access control.

Figure 2:
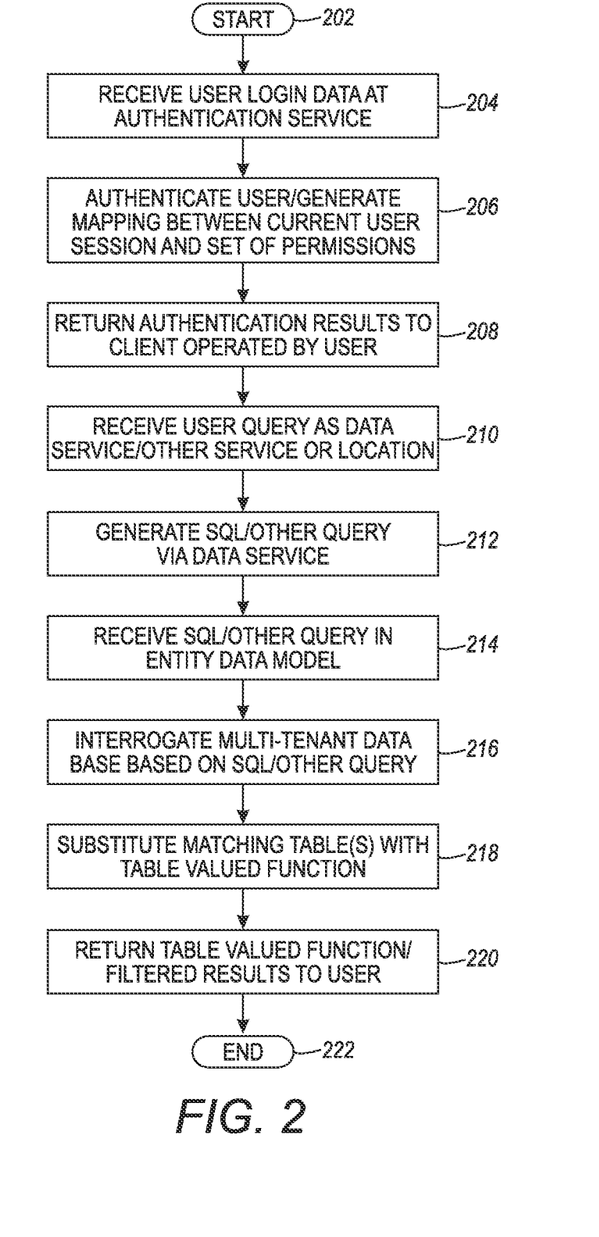
FIG. 2 illustrates a flowchart of overall data access and security processing, according to various embodiments.

FIG. 2 illustrates a flowchart of overall processing that can be used to receive the user query 116 and generate a table valued function 118 in response to that query, according to various embodiments of systems and methods for the enforcement of security profiles in a multi-tenant database. In 202, processing can begin. In 204, user login data can be received at the authentication service 104 and/or other service, platform, and/or site, via one or more networks 106 and/or other channels or connections. In 206, the authentication service 104 can authenticate the user, for instance using username, password, digital certificates, and/or other credentials, and can generate a mapping between the current user session and the set of permissions 120, for instance by interacting with the meta-data security engine 114 and/or other security application, platform, and/or service. In 208, the authentication service 104 can return the authentication results to the client in the set of clients 102 operated by the user. In aspects, if the user is authenticated, further screens, views, locations, and/or interfaces can be presented, while if the user is not authenticated, a failure message can be presented to the user and the current session can be interrupted or terminated. In 210, the query 116 can be received from the user at the data service 110 and/or other service, site, and/or location.

In 212, a SQL and/or other request, command, and/or instructions can be generated via the data service 110, reproducing and/or based on the user's original query 116. In 214, the SQL and/or other request, command, and/or instructions generated by the data service 110 can be received in the data entity model 112 and/or other published or exposed model, schema, and/or configuration for purposes of interrogating the set of tables 122 and/or other data structures of the multi-tenant database 108. In 216, the multi-tenant database 108 can be interrogated based on the SQL and/or other request, command, and/or instructions based on or corresponding to the query 116. In aspects, for instance, the SQL and/or other request, command, and/or instructions can comprise statements or instructions such as an instruction to "JOIN" or to "MERGE" two or more tables in the set of tables 122, and/or perform other actions or processing.

In 218, the meta-data security engine 114 and/or other security application, platform, and/or service can substitute a table valued function 118 (or table valued functions) for any matching table results or outputs obtained from the set of tables 122, prior to preparing results to transmit to the user. In 220, the meta-data security engine 114 and/or other security application, platform, and/or service can return the table valued function 118 to the user via the client they are operating in the set of clients 102, and/or otherwise. In aspects as shown, the table valued function 118 can be transmitted to the user via the data entity model 112 and/or other published or exposed model, schema, and/or configuration and data service 110, and/or can be routed or directed through other pathways or connections. In 222, processing can return to a prior processing point, jump to a further processing point, repeat, and/or end.

Figure 3:
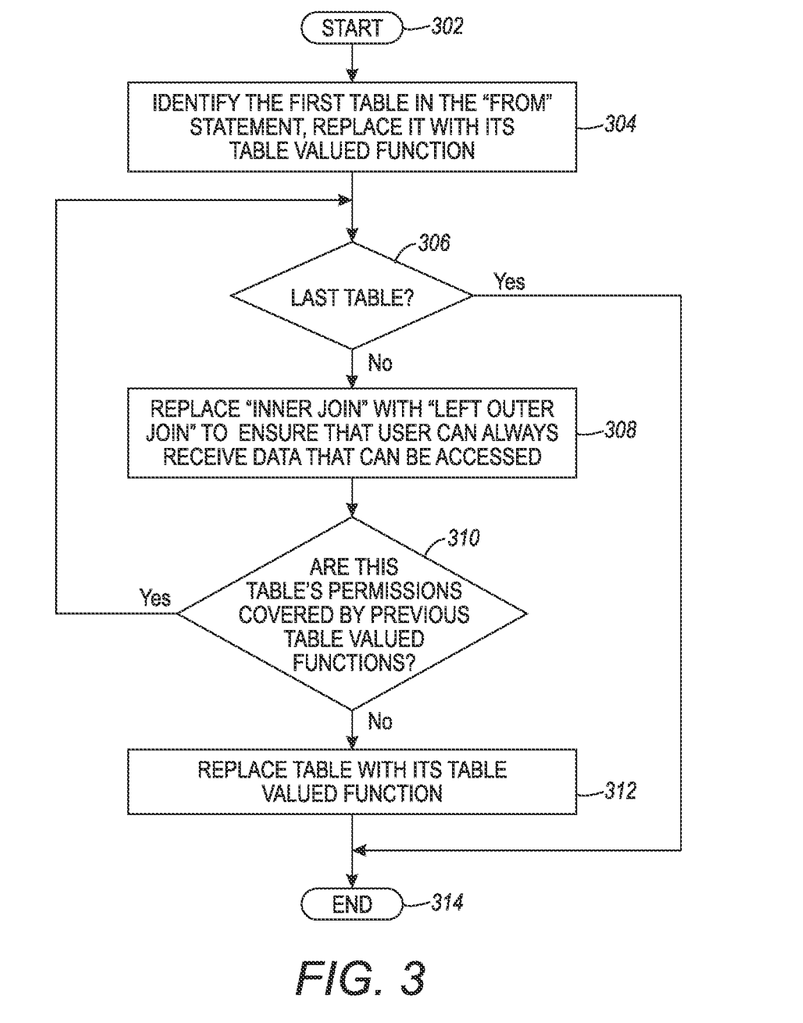
FIG. 3 illustrates a flowchart of various aspects of permission enforcement and data retrieval activities, according to various embodiments.

FIG. 3 illustrates a flowchart of processing that can be used by the meta-data security engine 114 and/or other security application, platform, and/or service to effect an interception, substitution, and/or other replacement of one or more tables in the set of tables 122 contained in the multi-tenant database 108 with a table valued function 118 (and/or table valued functions), according to aspects of the present teachings. In 302, processing can begin. In 304, the meta-data security engine 114 and/or other security application, platform, and/or service can identify the first table in a "From" SQL statement and/or other statement, instruction, and/or command received from the data entity model 112 and/or other published or exposed model, schema, and/or configuration. In 306, a determination can be made by the meta-data security engine 114 and/or other security application, platform, and/or service whether the identified table is the last table. If the determination is yes, processing can proceed to 314. If the determination is no, processing can proceed to 308, in which the meta-data security engine 114 and/or other security application, platform, and/or service can replace an associated "INNER JOIN" SQL statement with a "LEFT OUTER JOIN" statement to ensure that the user making the request can always receive data that can be legitimately accessed based on that user's set of permissions 120. Processing can then proceed to 310.

In 310, the a determination can be made by the meta-data security engine 114 and/or other security application, platform, and/or service whether the currently identified table's permissions in the set of permissions are covered and/or reflected in one or more previously generated table valued function 118. If the determination is yes, processing can return to 306. If the determination is no, processing can proceed to 312. In 312, the meta-data security engine 114 and/or other security application, platform, and/or service can replace the identified table with the tabled value function 188, and/or perform another substitution or alteration of the matching table(s) in the set of tables 122, to conform the results delivered to the user to that user's set of permissions. In 314, processing can return to a prior processing point, jump to a further processing point, repeat, or end.

Figure 4:
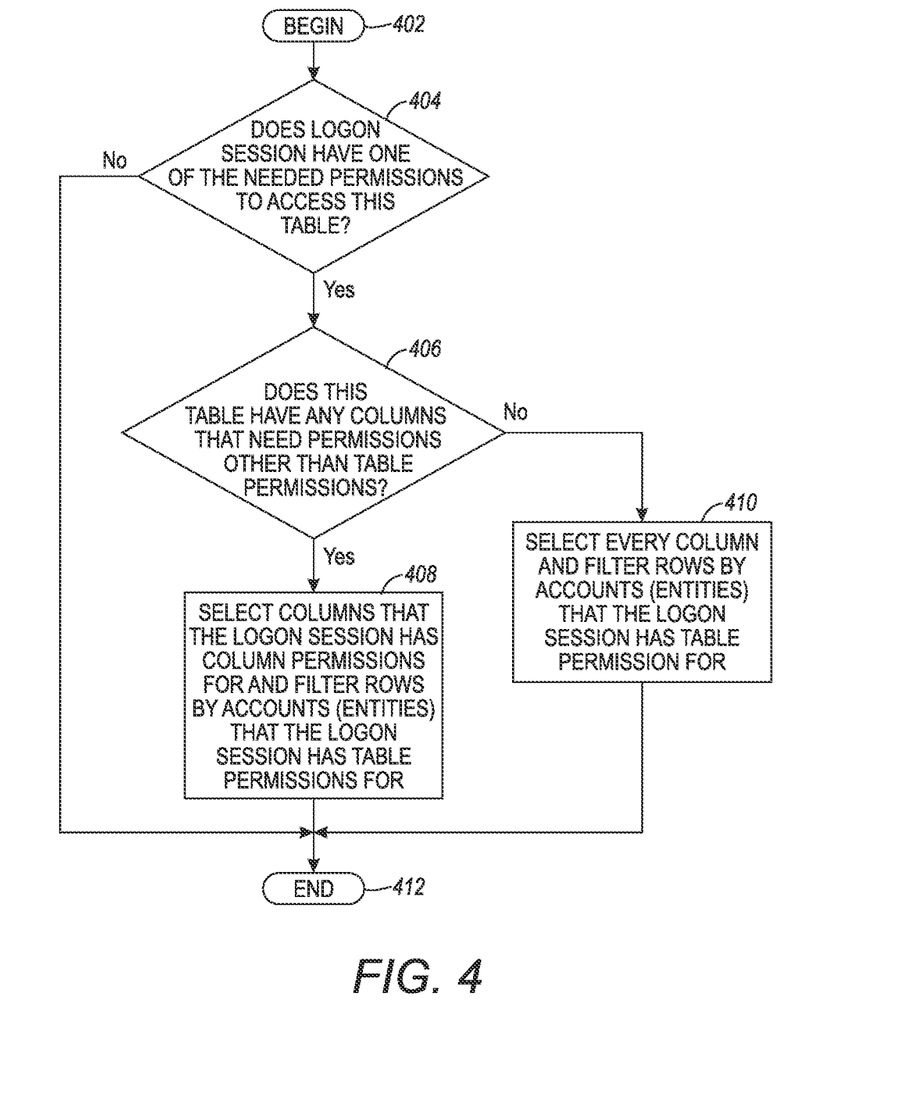
FIG. 4 illustrates a flowchart of column and/or row filtering using a user's retrieved permissions, according to various embodiments.

FIG. 4 illustrates a flowchart of permission checking and substitution processing that can be performed in systems and methods for the enforcement of security profiles in a multi-tenant database, according to aspects. In 402, processing can begin. In 404, a determination can be made by the authentication service 104, the meta-data security engine 114 and/or other security application, platform, and/or service whether the user's logon session has one of the permissions needed to access the identified or matching table or tables in the set of tables 122. In 406, a determination can be made whether the identified table(s) contain any columns that require further permissions, other than table permissions for the table as a whole. If the determination is yes, processing can proceed to 408. In 408, the meta-data security engine 114 and/or other security application, platform, and/or service can select a column or columns that the user's login session has permissions for, and filter rows by accounts, users, and/or other entities that the user's login session has table permissions for. Processing can then proceed to 412.

In 406, if the determination is that the identified tables do not contain any columns that require permissions other than table permissions, processing can proceed to 410. In 410, the meta-data security engine 114 and/or other security application, platform, and/or service can select every column in the identified table(s), and filter the rows of that table or tables by the accounts, users, and/or other entities the user's login session has permission for.

In 412, processing can repeat, return to a prior processing point, jump to a further processing point, or end.

Figure 5:
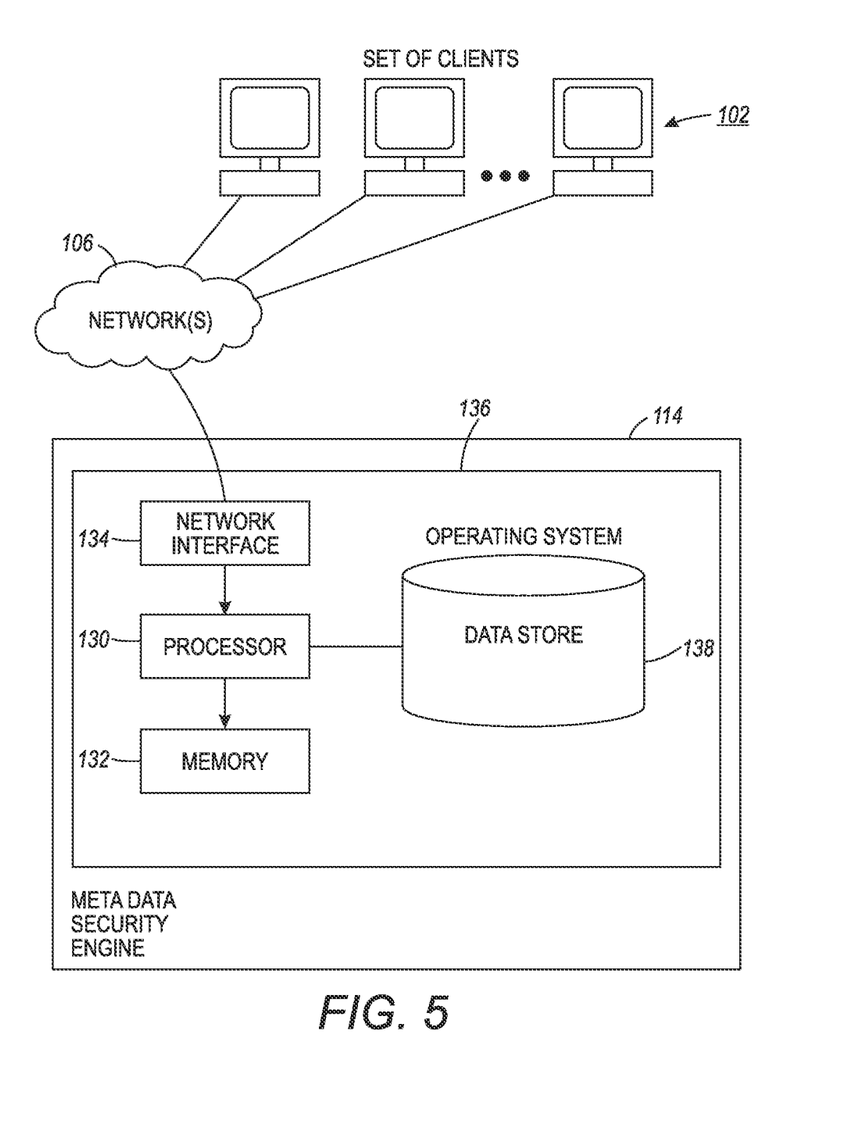
FIG. 5 illustrates exemplary hardware, software, and other resources that can be used systems and methods for the enforcement of security profiles in a multi-tenant database, according to various embodiments.

FIG. 5 illustrates various hardware, software, and other resources that can be used in implementations of the enforcement of security profiles in a multi-tenant database, according to embodiments. In embodiments as shown, meta-data security engine 114 and/or other security application, platform, and/or service can comprise a platform including processor 130 communicating with memory 132, such as electronic random access memory, operating under control of or in conjunction with an operating system 136. The processor 130 in embodiments can be incorporated in one or more servers, clusters, and/or other computers or hardware resources, and/or can be implemented using cloud-based resources. The operating system 136 can be, for example, a distribution of the Linux™ operating system, the Unix™ operating system, or other open-source or proprietary operating system or platform. The processor 130 can communicate with a data store 138, such as one or more databases stored on a local hard drive or drive array, to access and/or store working content, media, and/or other data used during security and other operations. The processor 130 can further communicate with a network interface 134, such as an Ethernet or wireless data connection, which in turn communicates with the one or more networks 106, such as the Internet or other public or private networks, via which data requests or queries can be received from the set of clients 102, and/or other devices or services. The processor 130 can, in general, be programmed or configured to execute control logic and perform data processing operations, including to generate the table valued function 118 and/or other content, media, information, and/or representations. In aspects, the authentication service 104, data service 110, data entity model 112 and/or other published or exposed model, schema, and/or configuration, the set of clients 102, and/or other devices, platforms, and/or services be or include resources similar to those of the meta-data security engine 114 and/or other security application, platform, and/or service, and/or can include additional or different hardware, software, and/or other resources. Other configurations of the meta-data security engine 114 and/or other security application, platform, and/or service, associated network connections, and other hardware, software, and service resources are possible.

The foregoing description is illustrative, and variations in configuration and implementation may occur to persons skilled in the art. For example, while embodiments have been described which generally adhere to the SQL database standard, in embodiments, other classes or types of databases can be used. For further example, while embodiments have been described in which data control operations are performed by a single meta-data security engine 114 and/or other security application, platform, and/or service, in embodiments, multiple security engines or services can provide data conditioning, filtering, and other services or functions. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of enforcing data privileges, comprising:
   receiving a query from a user to access a multi-tenant database;
   accessing, via a metadata security engine, a set of permissions specifying the user's data privileges to the multi-tenant database;
   identifying a set of objects, the set of objects including at least one object containing data matching the query in the multi-tenant database;
   authenticating, via the metadata security engine, the user's data privileges to at least one column of at least one object in the set of objects containing data matching the query, the metadata security engine being independent of the multi-tenant database;
   for each object in the set of objects having the user's data privileges authenticated, substituting one or more table-valued functions associated with the received query based on the set of permissions, the one or more table-valued functions conforming the at least one object containing data matching the query with the set of permissions specifying the user's data privileges, the substituting of the one or more table-valued functions comprising:
      identifying a first table in a FROM statement associated with the received query;
      replacing the first table with a first table-valued function;
      determining if the first table is the last table;
      replacing an INNER JOIN with LEFT OUTER JOIN when the first table is not the last table;
      determining whether a second table's permissions are covered by the first table-valued function; and
      replacing the second table with a second table-valued function when the second table's permissions are not covered by the first table-valued function; and
   transmitting a response to the received query, the response to the received query including the one or more table-valued functions for each object in the set of objects having the user's data privileges authenticated.

2. The method of claim 1, wherein the multi-tenant database comprises a set of tables.

3. The method of claim 2, wherein the at least one object comprises at least one table in the set of tables.

4. The method of claim 3, wherein the substituting comprises filtering at least one of rows or columns of at least one table of the set of tables based on the set of permissions.

5. The method of claim 2, wherein the set of permissions comprise data privileges associated with at least one of table in the set of tables, a row in the set of tables, a column in the set of tables, a field in the set of tables, an attribute in the set of tables, or a variable in the set of tables.

6. The method of claim 1, wherein the multi-tenant database comprises a structured query language (SQL) database.

7. The method of claim 1, wherein the set of permissions comprises at least one of access permission, read permission, write permission, storage permission, update permission, import permission, or export permission.

8. The method of claim 1, further comprising performing an authentication process on a login of the user before receiving the query.

9. The method of claim 1, wherein the query is received via a data service independent of the multi-tenant database.

10. The method of claim 1, further comprising exposing a schema of the data in the multi-tenant database via an entity data model.

11. A system, comprising:
    a first network interface to a user operating a device
    a second network interface to a multi-tenant database; and
    a processor, communicating with the device via the first network interface and the multi-tenant database via the second network interface, the processor being configured to
       receive a query from the user to access the multi-tenant database,
       access, via a metadata security engine, a set of permissions specifying the user's data privileges to the multi-tenant database,
       identify a set of objects, the set of objects including at least one object containing data matching the query in the multi-tenant database, authenticate, via a metadata security engine, the user's data privileges to at least one column of at least one object in the set of objects containing data matching the query, the metadata security engine being independent of the multi-tenant database, for each object in the set of objects having the user's data privileges authenticated, substitute one or more table-valued functions associated with the received query based on the set of permissions, the one or more table-valued functions conforming the at least one object containing data matching the query with the set of permissions specifying the user's data privileges, the substituting of the one or more table-valued functions configured to:
identify a first table in a FROM statement associated with the received query;
replace the first table with a first table-valued function;
determine if the first table is the last table;
replace an INNER JOIN with LEFT OUTER JOIN when the first table is not the last table;
determine whether a second table's permissions are covered by the first table-valued function; and
replace the second table with a second table-valued function when the second table's permissions are not covered by the first table-valued function; and
transmit a response to the received query, the response to the received query including the one or more table-valued functions for each object in the set of objects having the user's data privileges authenticated.

12. The system of claim 11, wherein the multi-tenant database comprises a set of tables.

13. The system of claim 12, wherein the at least one object comprises at least one table in the set of tables.

14. The system of claim 13, wherein the substituting comprises filtering at least one of rows or columns of at least one table of the set of tables based on the set of permissions.

15. The system of claim 12, wherein the set of permissions comprise data privileges associated with at least one of table in the set of tables, a row in the set of tables, a column in the set of tables, a field in the set of tables, an attribute in the set of tables, or a variable in the set of tables.

16. The system of claim 11, wherein the multi-tenant database comprises a structured query language (SQL) database.

17. The system of claim 11, wherein the set of permissions comprises at least one of access permission, read permission, write permission, storage permission, update permission, import permission, or export permission.

18. The system of claim 11, wherein the processor is further configured to access results of an authentication process performed on a login of the user before receiving the query.

19. The system of claim 11, wherein the query is received via a data service independent of the multi-tenant database.

20. The system of claim 11, further comprising exposing a schema of the data in the multi-tenant database via an entity data model.

* * * * *